United States Patent
Yao et al.

(10) Patent No.: US 9,179,350 B2
(45) Date of Patent: Nov. 3, 2015

(54) METHOD AND SYSTEM FOR REPORTING INTERFERENCE INFORMATION, AND UE

(75) Inventors: Jun Yao, Shenzhen (CN); Xiaojuan Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 100 days.

(21) Appl. No.: 13/979,007

(22) PCT Filed: Dec. 7, 2011

(86) PCT No.: PCT/CN2011/083642
§ 371 (c)(1),
(2), (4) Date: Jul. 10, 2013

(87) PCT Pub. No.: WO2012/094933
PCT Pub. Date: Jul. 19, 2012

(65) Prior Publication Data
US 2013/0322260 A1  Dec. 5, 2013

(30) Foreign Application Priority Data
Jan. 10, 2011  (CN) .......................... 2011 1 0003770

(51) Int. Cl.
*H04W 24/10* (2009.01)
*H04W 72/08* (2009.01)
(Continued)

(52) U.S. Cl.
CPC ................ *H04W 24/10* (2013.01); *H04L 1/00* (2013.01); *H04W 72/082* (2013.01); *H04W 28/048* (2013.01); *H04W 88/06* (2013.01)

(58) Field of Classification Search
USPC .................. 370/241, 247, 329; 455/452.2
See application file for complete search history.

(56) References Cited

U.S. PATENT DOCUMENTS

| | | |
|---|---|---|
| 2009/0312010 A1 | 12/2009 | Hall |
| 2010/0093364 A1* | 4/2010 | Ribeiro et al. ............. 455/452.2 |

(Continued)

FOREIGN PATENT DOCUMENTS

| | | |
|---|---|---|
| CN | 101646245 A | 2/2010 |
| CN | 101742526 A | 6/2010 |

(Continued)

OTHER PUBLICATIONS

International Search Report in international application number: PCT/CN2011/083642, mailed on Mar. 15, 2012.

(Continued)

*Primary Examiner* — Phuc Tran
(74) *Attorney, Agent, or Firm* — Oppedahl Patent Law Firm LLC

(57) ABSTRACT

The disclosure discloses a method for reporting interference information, which includes: User Equipment (UE) reports frequency information of a first radio technology or the frequency information of the first radio technology and additional interference information to a network side when detecting that an interference state of in-device coexistence interference is changed; or UE reports frequency information of a first radio technology to a network side when detecting that an interference state of in-device coexistence interference is changed, and the UE reports additional interference information to the network side after receiving from the network side an instruction of requiring reporting the additional information. The disclosure further provides a system for reporting interference information and UE. By means of the technical solution of the disclosure, the UE is capable of reporting the frequency information and the additional information to the network side.

11 Claims, 3 Drawing Sheets

---

301. UE reports frequency information of a first radio technology or the frequency information of the first radio technology and additional interference information to a network side when the UE detects a change in an interference state of in-device coexistence interference

↓

302. The network side makes a decision according to the frequency information reported or the frequency information and the additional interference information reported

↓

303. The network side sends the decision to the UE

(51) Int. Cl.
*H04L 1/00* (2006.01)
*H04W 28/04* (2009.01)
*H04W 88/06* (2009.01)

(56) References Cited

U.S. PATENT DOCUMENTS

| | | | |
|---|---|---|---|
| 2010/0098135 A1 | 4/2010 | Eitan | |
| 2011/0217985 A1* | 9/2011 | Gorokhov | 455/452.2 |
| 2011/0256834 A1* | 10/2011 | Dayal et al. | 455/67.7 |
| 2012/0164948 A1* | 6/2012 | Narasimha et al. | 455/63.1 |
| 2014/0031036 A1* | 1/2014 | Koo et al. | 455/434 |

FOREIGN PATENT DOCUMENTS

| | | |
|---|---|---|
| JP | H04215327 A | 8/1992 |
| JP | 2006250830 A | 9/2006 |
| JP | 2010516190 A | 5/2010 |

OTHER PUBLICATIONS

English Translation of the Written Opinion of the International Search Authority in international application number: PCT/CN2011/083642, mailed on Mar. 15, 2012.

3GPP TR 36.816 v1.0.0; Study on signalling and procedure for interference avoidance for in-device coexistence; Nov. 2010.

CMCC, "Framework and procedure of in-device coexistence interference avoidance," 3GPP TSG-RAN WG2 Meeting #72, R2-106382, Nov. 19, 2010. (6 pages—see entire document).

ZTE, "Considerations on the detail procedure for FDM approach," 3GPP TSG-RAN WG2 Meeting #72bis, R2-110243, Jan. 21, 2011. (7 pages—see entire document).

Media Tek (Email Discussion Rapporteur), "Email discussion on information from UE for FDM solution," 3GPP TSG-RAN WG2 Meeting #72, R2-106291, Nov. 12, 2010. (8 pages—see entire document).

* cited by examiner

US 9,179,350 B2

METHOD AND SYSTEM FOR REPORTING INTERFERENCE INFORMATION, AND UE

TECHNICAL FIELD

The disclosure relates to a technology of co-existence of multiple radio technologies in the field of User Equipment (UE), and in particular to a method and a system for reporting interference information, and UE.

BACKGROUND

Along with the development of radio technologies and smart UE, multiple radio technologies need to be integrated into the same UE so as to support different communication requirements from UE. FIG. 1 is a structural diagram of UE using three radio technologies simultaneously according to the prior art, as shown in FIG. 1, the UE includes a sub-module 101 using a Long Term Evolution (LTE) technology, a sub-module 102 using a Wireless Local Area Network (WLAN) technology stipulated by an IEEE Std 802.11 standard, i.e., a Wireless Local Area Network Station (WLAN-STA), and a sub-module 103 using a Bluetooth technology stipulated by an IEEE Std 802.15 standard; the three sub-modules 101, 102 and 103 are connected by an inter-radio interface, for example, the sub-module 101 and the sub-module 102 are connected by an L101 interface, the sub-module 102 and the sub-module 103 are connected by an L102 interface, and the sub-module 101 and the sub-module 103 are connected by an L103 interface, or the three sub-modules are controlled by a common control module 104; and the three sub-modules of the UE communicate wirelessly with opposite equipment corresponding to their respective radio technologies, respectively, wherein the sub-module 101 communicate with an evolved NodeB (LTE eNB, E-UTRAN NodeB) 105 by an air interface wirelessly, the sub-module 102 communicate with another WLAN STA 106 by an air interface wirelessly, and the sub-module 103 communicate with another Bluetooth 107 by an air interface wirelessly.

When multiple radio technology sub-modules are designed in the same UE, in view of the limited volume of the UE, it will certainly mean that, in the UE designed with two or more radio technology sub-modules simultaneously, a spatial distance between the two or more radio technology sub-modules is very short, such as only few centimeters or even few millimeters, and spatial isolation between antenna interfaces corresponding to the two or more radio technology sub-modules cannot be designed to be large enough, so that in the case that all radio technology sub-modules in the same UE operate within neighbour frequency bands, one of the all radio technology sub-modules will interfere with reception of another radio technology sub-module when transmitting signals due to out of frequency band emission, spurious emission, blocking and the like, and vice versa; furthermore, filtering technologies in the prior art cannot eliminate such neighbour frequency interference, thereby influencing communication quality of all radio technology sub-modules; such neighbour frequency interference phenomenon is referred to as "In-device Coexistence Interference (ICO)" in this field.

In the UE shown as FIG. 1, the WLAN-STA and the Bluetooth operate at an Industrial Scientific and Medical (ISM) frequency band with a frequency range of 2.4 GHz to 2.5 GHz, wherein a WLAN channel use a frequency range of 2.4 GHz to 2.4835 GHz within the ISM frequency band, a Bluetooth channel uses a frequency range of 2.4 GHz to 2.497 GHz within the ISM frequency band; and LTE in a Time Division Duplex (TDD) mode operates at a frequency band 40 (Frequency band 40) with a frequency range of 2.3 GHz to 2.4 GHz and a frequency band 38 (Frequency band 38) with a frequency range of 2.57 GHz to 2.62 GHz, wherein an uplink transmission (i.e., transmission from UE to an eNB) in a Frequency Division Duplex (FDD) mode operates at a frequency band 7 (Frequency band 7) with a frequency range of 2.5 GHz to 2.57 GHz, and a downlink transmission (i.e., transmission from the eNB to the UE) in the FDD mode operates at a frequency range of 2.62 GHz to 2.69 GHz within the Frequency band 7. FIG. 2 is a schematic distribution diagram of an ISM frequency band and an LTE frequency band according to the prior art, as shown in FIG. 2, since the ISM frequency band is just a neighbour of the Frequency band 40 in the LTE TDD mode and an uplink transmission frequency band within the Frequency band 7 in the LTE FDD mode, if the sub-module 101 is in the TDD mode and uses the Frequency band 40, then mutual interference will occur between the sub-module 101 and the sub-module 102 and between the sub-module 101 and the sub-module 103, and if the sub-module 101 is in the FDD mode and uses the Frequency band 7, since the uplink transmission frequency band within the LTE Frequency band 7 is a neighbour of the ISM frequency band, uplink transmission of the sub-module 101 will interfere with downlink reception of the sub-module 102 or the sub-module 103.

In-device coexistence interference can influence communication quality of UE and reduce communication experience of users, in order to suppress the influence of in-device coexistence interference on communication quality of all radio technologies, a network side may use a frequency division multiplexing way, that is, vary an operation frequency of an LTE sub-module or varying operation frequencies of other radio sub-modules, so that frequency intervals between the operation frequency of the LTE sub-module and the operation frequencies of the other radio sub-modules are large enough; or the network side may use time division multiplexing, that is, controlling transmission time between the LTE sub-module and the other radio sub-modules, so that the LTE sub-module and the other radio sub-modules transmit signals in different time segments; or in the case of uplink transmission of the LTE sub-module interfering with downlink transmission of the other radio sub-modules, the network side may perform a power control on the uplink transmission of the LTE sub-module to control an uplink transmission power of the LTE sub-module within a certain limited range. No matter which solution above is used to eliminate in-device coexistence interference, the network side cannot acquire in-device coexistence interference information in the prior art, so that negative influences resulted from in-device coexistence interference cannot be eliminated.

SUMMARY

In view of the problem above, the main purpose of the disclosure is to provide a method and a system for reporting interference information, and UE which can report frequency information and additional information related to interference to a network side.

In order to achieve the purpose above, the technical solution of the disclosure is implemented as follows.

A method for reporting interference information is provided in the disclosure, which includes:

UE reports frequency information of a first radio technology or the frequency information of the first radio technology and additional interference information to a network side when the UE detects a change in an interference state of in-device coexistence interference; or UE reports frequency information of a first radio technology to a network side when the UE detects a change in an interference state of in-device coexistence interference, and the UE reports additional interference information to the network side after receiving from the network side an instruction of requiring reporting the additional information.

In the above method, the change in the interference state of in-device coexistence interference may include: the UE changes from a state that there is no in-device coexistence interference to a state that there is in-device coexistence interference, and the UE changes from a state that there is in-device coexistence interference and an interference suppression measure has been performed to the state that there is no in-device coexistence interference.

In the above method, the frequency information of the first radio technology may refer to undisturbed frequency information and/or disturbed frequency information.

In the above method, the undisturbed frequency information may refer to an undisturbed operation frequency range and/or undisturbed operation frequencies of the first radio technology which does not produce in-device coexistence interference with enabled other radio technologies when the first radio technology and other radio technologies operate simultaneously.

In the above method, the disturbed frequency information may refer to a disturbed operation frequency range and/or disturbed operation frequencies of the first radio technology which produces in-device coexistence interference with enabled other radio technologies when the first radio technology and other radio technologies operate simultaneously.

In the above method, the method may further include: the frequency information of the first radio technology reported to the network side by the UE is null when the UE detects that there is no in-device coexistence interference.

In the above method, the reporting frequency information of a first radio technology to a network side may include:

the UE reports the frequency information of the first radio technology to the network side by reporting a lower limit frequency and/or an upper limit frequency of a frequency range or by reporting a disturbed frequency range using an index number of a frequency band, wherein the lower limit frequency is a left end value of an interval of the disturbed frequency range, and the upper limit frequency is a right end value of the interval of the disturbed frequency range.

In the above method, the reporting a lower limit frequency and/or an upper limit frequency of a frequency range may include: reporting a specific value or an Evolved Universal Mobile Telecommunication System (UMTS) Terrestrial Radio Access Absolute Radio Frequency Channel Number (EARFCN); and the reporting a frequency range using an index number of a frequency band may include: the UE searches an index number corresponding to the frequency range in a frequency information list according to the frequency information list pre-determined by the UE and a network or the frequency information list pre-defined by a protocol, and the UE notifies the index number to the network side when the UE reports the frequency information of the first radio technology.

In the above method, the additional interference information may be:

Time Division Multiplexing (TDM) information when all radio technologies operate in a TDM way, and/or a currently available measurement result, and/or an indication that uplink transmission of the first radio technology interferes with reception of other radio technologies.

In the above method, after reporting the frequency information of the first radio technology or the frequency information of the first radio technology and the additional interference information to the network side, the method may include: the network side makes a decision according to the frequency information reported or the frequency information and the additional interference information reported, and sends the decision to the UE.

In the above method, the decision may be:

switching the UE to a same coverage cell which does not produce in-device coexistence interference; or cancelling or stopping an interference suppression measure being implemented by the UE; or switching the UE to a neighbour cell which does not produce in-device coexistence interference; or deleting or deactivating one or more Secondary Cells (Scells) having in-device coexistence interference, and/or adding or activating one or more Scells which have no in-device coexistence interference and are capable of performing carrier aggregation with a Primary Cell (Pcell) and have a different coverage from the deleted or deactivated Scell(s); or configuring a TDM operation mode for all enabled radio technologies producing in-device coexistence interference; or deleting or deactivating one or more Scells having in-device coexistence interference, and/or adding or activating other Scells which have no in-device coexistence interference and are capable of performing carrier aggregation with a Pcell and have a same coverage as the deleted or deactivated Scell(s); or reducing or limiting an uplink transmission power of the first radio technology in the UE.

In the above method, the instructing the UE to report the additional interference information may include:

the network side instructs the UE to report the additional interference information by sending an instruction of reporting the additional interference information or by configuring measurement for the UE, wherein the instruction of reporting the additional interference information is an instruction of reporting additional interference information in an interference direction, or is an instruction of reporting additional interference information of TDM information.

The disclosure further provides a system for reporting interference information, which includes: UE and a network side, wherein the UE is configured to report frequency information of a first radio technology or the frequency information of the first radio technology and additional interference information to the network side when detecting the UE detects a change in an interference state of in-device coexistence interference; or the UE is configured to report frequency information of a first radio technology to the network side when the UE detects a change in an interference state of in-device coexistence interference; and to report additional interference information to the network side after the UE receives from the network side an instruction of requiring reporting the additional information; and the network side is configured to instruct the UE to report the additional interference information.

In the above system, the network side may be further configured to make a decision according to the frequency information reported or the frequency information and the additional interference information reported, and to send the decision to the UE.

The disclosure further provides UE, which is configured to report frequency information of a first radio technology or the frequency information of the first radio technology and additional interference information to a network side when the UE detects a change in an interference state of In-device Coexistence Interference; or configured to report frequency information of a first radio technology to a network side when the UE detects a change in an interference state of in-device coexistence interference; and to report additional interference information to the network side after receiving from the network side an instruction of requiring reporting the additional information.

By means of the method and the system for reporting interference information, and UE provided by the disclosure, UE reports frequency information of a first radio technology or the frequency information of the first radio technology and additional interference information to a network side when the UE detects a change in an interference state of in-device coexistence interference; or UE reports frequency information of a first radio technology to a network side when the UE detects a change in an interference state of in-device coexistence interference, and the UE reports additional interference information to the network side after the UE receives from the network side an instruction of requiring reporting the additional information, thereby realizing that the UE reports the frequency information and the additional information related to interference to the network side; the implementation method is easy and flexible, and has a higher efficiency, and can ensure that the network side may take an appropriate measure for suppressing in-device coexistence interference according to the reported frequency information and additional information.

DETAILED DESCRIPTION

In embodiments of the disclosure, UE refers to a user communication terminal equipment with co-existence of two or more radio technologies, including a mobile phone, a smart phone, portable communication equipment, Personal Digital Assistant (PDA) and the like; coexistence of two or more radio technologies refers to that there are two or more radio transceivers within the UE, wherein the first radio transceiver uses the first radio technology, operates under the first radio communication protocol standard, and receives and transmits signals within a frequency range stipulated by a protocol; the second radio transceiver uses the second radio technology, operates under the second radio communication protocol standard, and receives and transmits signals within a frequency range stipulated by a protocol; and so on. An operation frequency range of the first radio technology and operation frequency ranges of other radio technologies are overlapped or neighbouring at least in part, wherein the first radio technology may be the LTE technology, a Universal Mobile Telecommunication System (UMTS) technology, a Wimax technology using an IEEE 802.16 and the like, and a part of operation frequencies of the first radio technology or harmonic frequencies thereof and the ISM frequency range are overlapped or neighbouring; the other radio technologies may be the WLAN technology, the Bluetooth technology, a Zigbee technology using an IEEE 802.15.4 and the like, and operation frequencies of the other radio technologies are the ISM frequency range.

The basic idea of the disclosure is: UE reports frequency information of a first radio technology or the frequency information of the first radio technology and additional interference information to a network side when the UE detects a change in an interference state of in-device coexistence interference; or UE reports frequency information of a first radio technology to a network side when the UE detects a change in an interference state of in-device coexistence interference, and the UE reports additional interference information to the network side after the UE receives from the network side an instruction of requiring reporting the additional information.

The disclosure will further be illustrated in detail with the drawings and specific embodiments hereinafter.

Figure 3:
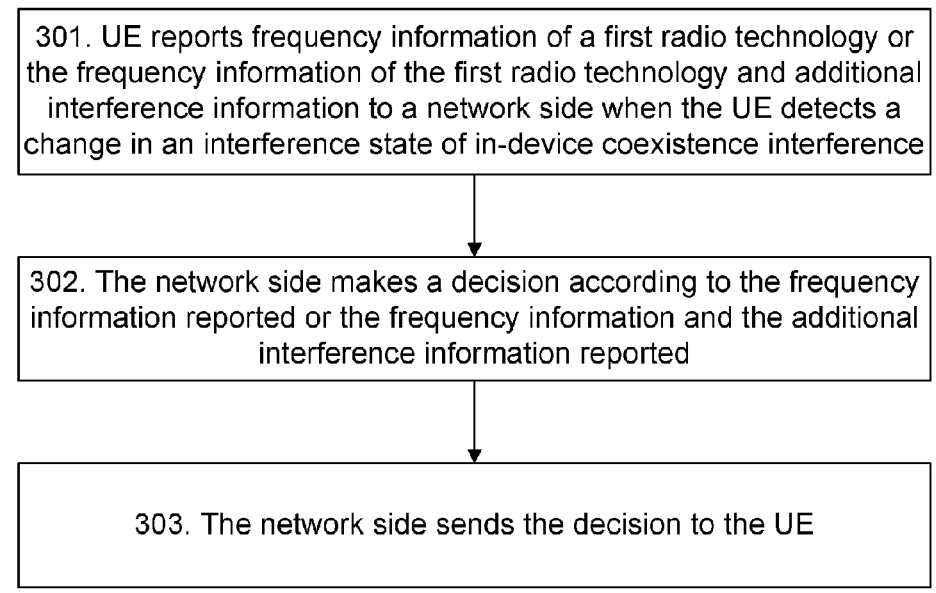
FIG. 3 is a schematic flowchart of a method for reporting interference information according to the first embodiment of the disclosure.

A method for reporting interference information is provided by the disclosure, and FIG. 3 is a schematic flowchart of the method for reporting interference information according to the first embodiment of the disclosure. As shown in FIG. 3, the method includes the following steps:

Step 301: UE reports frequency information of a first radio technology or the frequency information of the first radio technology and additional interference information to a network side when the UE detects a change in an interference state of in-device coexistence interference.

Specifically, the change in the interference state of in-device coexistence interference comprises: the UE changes from a state that there is no in-device coexistence interference to a state that there is in-device coexistence interference, and the UE changes from a state that there is in-device coexistence interference and an interference suppression measure has been performed to the state that there is no in-device coexistence interference; and the method used for determining by the UE that the interference state of in-device coexistence interference is changed is: the UE determines the state of in-device coexistence interference according to a state of each enabled radio technology sub-module coexisting within the UE, wherein the state of each enabled radio technology sub-module coexisting within the UE is an enabled/disabled state of each radio technology sub-module coexisting within the UE;

when the first radio technology and other radio technologies in the UE are in the enabled state simultaneously and when respective operation frequencies of all radio technologies are close enough to produce in-device coexistence interference, the UE determines that a change in the interference state of in-device coexistence interference is detected; or when there is already in-device coexistence interference in the UE and the UE has taken an interference suppression measure, if a certain radio technology producing interference is disabled, then the UE determines that a change in the interference state of in-device coexistence interference is detected;

the UE reports the frequency information of the first radio technology or the frequency information of the first radio technology and the additional interference information to the network side when the UE detects that the interference state of in-device coexistence interference is changed; wherein the frequency information of the first radio technology is at least one of undisturbed frequency information and disturbed frequency information, the undisturbed frequency information refers to undisturbed operation frequencies or an undisturbed operation frequency range of the first radio technology which does not produce in-device coexistence interference with enabled other radio technologies when the first radio technology and other radio technologies operate simultaneously, and the disturbed frequency information refers to disturbed operation frequencies or a disturbed operation frequency range of the first radio technology which produces in-device coexistence interference with enabled other radio technologies when the first radio technology and other radio technologies operate simultaneously; here, if the UE determines that there is no in-device coexistence interference in Step 301, then the frequency information of the first radio technology reported to the network side by the UE is null;

the reporting frequency information of a first radio technology to a network side includes: the UE reports the frequency information of the first radio technology to the network side by reporting a lower limit frequency and/or an upper limit frequency of a frequency range or by reporting a disturbed frequency range using an index number of a frequency band, wherein the lower limit frequency is a left end value of an interval of the disturbed frequency range, and the upper limit frequency is a right end value of the interval of the disturbed frequency range;

the reporting a lower limit frequency and/or an upper limit frequency of a frequency range includes: reporting a specific value or an Evolved Universal Mobile Telecommunication System (UMTS) Terrestrial Radio Access Absolute Radio Frequency Channel Number (EARFCN, E-UTRA Absolute Radio Frequency Channel Number); and the reporting a frequency range using an index number of a frequency band includes: the UE searches an index number corresponding to the frequency range in a frequency information list according to the frequency information list predetermined by the UE and a network or the frequency information list pre-defined by a protocol, and the UE notifies the index number to the network side when reporting the frequency information of the first radio technology.

Figure 1:
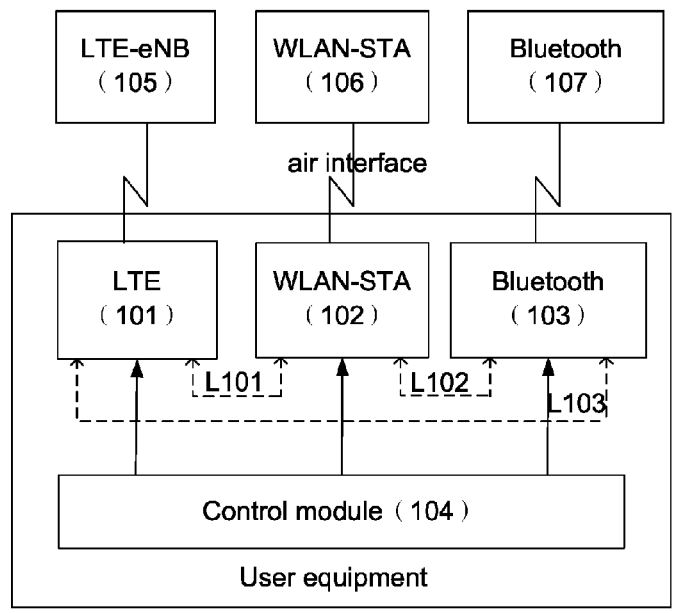
FIG. 1 is a structural diagram of UE using three radio technologies simultaneously according to the prior art.
Figure 2:
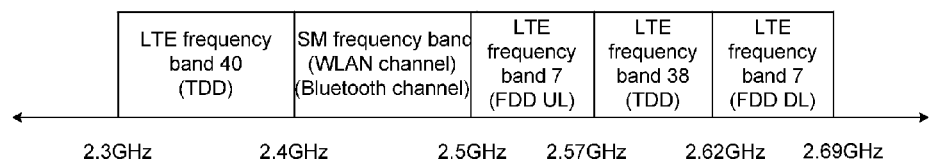
FIG. 2 is a schematic distribution diagram of an Industrial Scientific and Medical (ISM) frequency band and a Long Term Evolution (LTE) frequency band according to the prior art.

Taking the first radio technology being the LTE technology as an example, the frequency information of the first radio technology is the frequency information of the LTE technology, i.e., undisturbed frequency information and/or disturbed frequency information of the LTE technology; and a method for estimating the frequency information of the LTE technology is: a central frequency being used by the other enabled radio technology sub-modules using the ISM frequency range in the UE, transmission powers used by other radio technology sub-modules, characteristics of a filter and other parameters is acquired through the L101 interface, the L103 interface or the control module 104 as shown in FIG. 1, and the UE estimates the frequency information of the LTE technology according to the above parameters;

here, taking an disturbed frequency range of the LTE technology as an example, a frequency range in which the LTE technology and a BT (Bit Torrent) technology produce interference and a frequency range in which the LTE technology and the WLAN technology produce interference are given according to a specific testing environment, wherein the adopted parameter values are typical values of the LTE technology, the BT technology and the WLAN technology; when the LTE technology interferes with the BT technology, the disturbed frequency range of the LTE technology is shown in Table 1:

TABLE 1

| No. | Disturbed frequency range of the LTE technology (MHz) | Central frequency range used by the BT technology (MHz) |
|---|---|---|
| 1 | [2310, 2390] | [2402, 2410] |
| 2 | [2355, 2390] | 2420 |
| 3 | [2375, 2390] | [2430, 2480] |
| 4 | 2510 | [2402, 2440] |
| 5 | [2510, 2515] | [2450, 2460] |
| 6 | [2510, 2560] | [2470, 2480] | when the LTE technology interferes with the WLAN technology, the disturbed frequency range of the LTE technology is shown in Table 2:

TABLE 2

| No. | Disturbed frequency range of the LTE technology (MHz) | Central frequency range used by the WLAN technology (MHz) |
|---|---|---|
| 7 | [2310, 2390] | 2412 |
| 8 | [2325, 2390] | 2422 |
| 9 | [2375, 2390] | [2432, 2472] |
| 10 | 2510 | [2422, 2452] |
| 11 | [2510, 2525] | 2462 |
| 12 | [2510, 2545] | 2472 | when the BT technology interferes with the LTE technology, the disturbed frequency range of the LTE technology is shown in Table 3:

TABLE 3

| No. | Disturbed frequency range of the LTE technology (MHz) | Central frequency range used by the BT technology (MHz) |
|---|---|---|
| 13 | [2310, 2390] | [2402, 2410] |
| 14 | [2375, 2390] | [2420, 2440] |
| 15 | [2385, 2390] | [2450, 2480] | when the WLAN technology interferes with the LTE technology, the disturbed frequency range of the LTE technology is shown in Table 4:

TABLE 4

| No. | Disturbed frequency range of the LTE technology (MHz) | Central frequency range used by the WLAN technology (MHz) |
|---|---|---|
| 16 | [2310, 2390] | 2412 |
| 17 | [2335, 2390] | 2422 |
| 18 | [2375, 2390] | [2432, 2473] |

Figure 5:
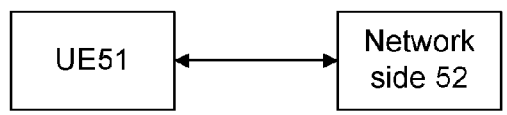
FIG. 5 is a structural diagram of a system for reporting interference information according to the disclosure.

It can be seen from Tables 1-4 that the UE can estimate the disturbed frequency range of the LTE technology according to enabled conditions of the other radio technologies, central frequency being used and other parameters;

for example, if the BT technology interferes with the LTE technology at present and the central frequency of a frequency band used by the BT technology is within [2420, 2440], then the disturbed frequency range of the LTE technology is [2375, 2390], based on the frequency range, in the embodiment, when the UE determines that the interference state of in-device coexistence interference is changed, the UE can report the frequency information of the first radio technology by using two following ways:

Way 1: reporting a lower limit frequency Flow and/or an upper limit frequency Fhigh of a frequency range;

specifically, the reporting a lower limit frequency Flow and/or an upper limit frequency Fhigh of a frequency range may be reporting an index number or an EARFCN, wherein the lower limit frequency Flow is a left end value of an interval of the disturbed frequency range of the LTE technology, and the upper limit frequency Fhigh is a right end value of the interval of the disturbed frequency range of the LTE technology, the EARFCN is an integer between 0 to 65535, which is used for representing carrier frequencies of all E-UTRA; when the UE and the network side have pre-agreed a frequency interval, only one of the upper limit frequency and the lower limit frequency needs to be reported here;

here, by using a specific value to report a lower limit frequency Flow and/or an upper limit frequency Fhigh of a frequency range, the UE can report the specific lower limit frequency Flow value of 2375 and/or the specific upper limit frequency Fhigh value of 2390 to the network side; or by using an EARFCN to report a lower limit frequency Flow and/or an upper limit frequency Fhigh of a frequency range, the usage of the EARFCN in the LTE technology refers to an E-UTRA channel number list shown in FIG. 5:

TABLE 5

| Number of E-UTRA operation | Downlink | | | Uplink | | |
|---|---|---|---|---|---|---|
| frequency band | $F_{DL\_low}$ (MHz) | $N_{offs\text{-}DL}$ (MHz) | $N_{DL}$ (MHz) | $F_{UL\_low}$ (MHz) | $N_{offs\text{-}UL}$ (MHz) | $N_{UL}$ (MHz) |
| 1 | 2110 | 0 | 0~599 | 1920 | 18000 | 18000~18599 |
| ... | | | | | | |
| 7 | 2620 | 2750 | 2750~3449 | 2500 | 20750 | 20750~21449 |
| ... | | | | | | |
| 40 | 2300 | 38650 | 38650~39649 | 2300 | 38650 | 38650~39649 |

E-UTRA operation frequency band number in Table 5 is a number of a specific frequency band where a central frequency operated by the LTE technology is, NDL and NUL in Table 5 is a downlink EARFCN and an uplink EARFCN respectively, and the corresponding relationship between the carrier frequency and the EARFCN can be obtained according to Table 5, wherein specific computation formulas are:

$$FDL=FDL\_low+0.1(NDL-NOffs\text{-}DL) \quad (1)$$

$$FUL=FUL\_low+0.1(NDL-NOffs\text{-}UL) \quad (2)$$

wherein the formula (1) shows the corresponding relationship between the downlink carrier frequency and the downlink EARFCN, and the formula (2) shows the corresponding relationship between the uplink carrier frequency and the uplink EARFCN;

in the embodiment, the disturbed frequency range is located at Frequency band 40, as shown in the last line of Table 5, at this moment, the BT technology interferes with reception of the LTE technology, so, by searching data corresponding to Frequency band 40 in the downlink in Table 5, the value of the lower limit frequency Flow of the reported frequency range can be calculated to be 39400 and the value of the upper limit frequency Fhigh of the reported frequency range can be calculated to be 39550 according to the formula (1);

reporting the frequency information of the first radio technology to the network side by reporting the lower limit frequency and/or the upper limit frequency of the frequency range is advantaged in that the frequency range is relatively flexible because the reported frequency range can be changed dynamically, and relatively high feasibility is achieved because it can be realized by using existing protocols fully;

Way 2: reporting a frequency range using an index number of a frequency band;

specifically, the method of reporting a frequency range using an index number of a frequency band is: according to a frequency band list which is pre-defined by a protocol, or made by the UE and the network side which divide all frequency bands that may interfere with other radio technologies and then number all the frequency bands, the UE and the network side notify the frequency band list to an opposite end to ensure that the UE and the network side store the same frequency band list; the number is an index number by which a specific corresponding frequency range can be found, for example, shown as Tables 1-4, the index number may be a figure in a serial number column in Tables 1-4; the index number corresponding to different frequency ranges is pre-agreed by the network side and the UE, and the UE only needs to notify the index number to the network side when reporting the frequency information of the first radio technology; by setting a serial number range reasonably, the network side can further know a specific radio technology which produces interference and a specific interference direction; for example, if the UE reports the index number 14 to the network side, then the network side can determine, according to the frequency list, that transmission of the BT technology interferes with reception of the LTE technology currently;

reporting the frequency information of the first radio technology to the network side by reporting the frequency range using the index number of the frequency band is advantaged in the small load of information reported by the UE to the network side, and high efficiency, i.e., conveying more information using less information bits; or when reporting the frequency information of the first radio technology, the UE may simultaneously report currently available additional interference information, wherein the additional information refers to other information required by the network side for making a decision except for frequency information, which includes TDM information when all radio technologies operate in the TDM mode, and/or currently available measurement results, and/or instructions that uplink transmission of the first radio technology interferes with reception of other radio technologies;

wherein, when the additional interference information that the UE reports to the network side is TMD information, the TDM information is: notification information during TDM transmission; and/or technology types and service types of other radio technologies that coexist with the LTE technology in the UE (for example, if other radio technology is the Bluetooth technology, then a current service type of the Bluetooth technology is a voice application of a Voice over Internet Protocol (VoIP)); and/or LTE transmission time length information and period information of TDM (for example, the period is 50 ms and the LTE transmission time length is 20 ms); and/or period information of TDM and information of the ratio between an LTE transmission time length and an non-LTE transmission time length within one TDM period (for example, one TDM period equals a sum of the LTE transmission time length and the non-LTE transmission time length); and/or indexing information that the UE obtains by searching the TDM information according to protocol stipulations, wherein a TDM information list stipulated by one protocol is shown in Table 6, and the UE may report indexing information in Table 6 to the network side by searching an actual coexisting radio technology and a current service type thereof:

TABLE 6

| Index number | Coexisting radio technology | Service type | TDM period (unit: millisecond) | LTE transmission time (unit: millisecond) |
| --- | --- | --- | --- | --- |
| 1 | Bluetooth | Streaming media with high definition | 60 | 20 |
| 2 | WLAN | File download | 60 | 30 |
| ... | | | | | it should be noted here that, for the LTE transmission time length information and the period information of TDM, and for the period information of TDM and the information of the ratio between the LTE transmission time length and the non-LTE transmission time length within one TDM period, these pieces of TDM information are the TDM information suggested by the UE to the network side, a final TDM relationship between the LTE technology and other radio technologies, i.e., a sequential relationship between the LTE transmission time length and the non-LTE transmission time length; the TDM information suggested by the UE is provided to the network side for reference when the network side makes a decision; the network side further needs to make a decision according to its own decision;

when the additional interference information that the UE reports to the network side is a currently available measurement result, the currently available measurement result is a measurement result having been obtained from all currently configured measurement tasks;

when the additional interference information that the UE reports to the network side is an indication that uplink transmission of the first radio technology interferes with reception of other radio technologies, the indication means that a specific circumstance of current interference is that the transmission of the first radio technology in the UE interferes with reception of other radio technologies; for example, the UE determines that there is in-device coexistence interference, when reporting the frequency information of the first radio technology, the UE can also suggest, by reporting additional interference information to the network side simultaneously, that the network side give a decision needed by the UE itself which is used as an interference suppression measure of the UE, if the UE hopes the network side to give a decision using the TDM, then the UE uses TDM information as the additional interference information and reports it to the network side together with the frequency information of the first radio technology; or the UE can also send all currently available additional interference information to the network side, and wait for the network side to make a decision.

Step 302: The network side makes a decision according to the frequency information reported or the frequency information and the additional interference information reported.

Specifically, the network side makes a decision according to the frequency information of the first radio technology reported by the UE or the frequency information of the first radio technology and the additional interference information reported by the UE, and sends the decision to the UE;

if the UE reports the frequency information of the first radio technology to the network side, then the network side can make one of the following decisions: (1) switching the UE to a cell having the same coverage which does not produce in-device coexistence interference; (2) if the UE is performing carrier aggregation, deleting or deactivating one or more Scells having in-device coexistence interference, and/or adding or activating one or more Scells which have no in-device coexistence interference and are capable of performing carrier aggregation with a Pcell and have the same coverage as the deleted or deactivated Scell(s); and (3) if the frequency information of the first radio technology reported to the network side by the UE is null, which indicates that there is no in-device coexistence interference in the UE, then cancelling an interference suppression measure taken previously by the network side;

if the UE reports the frequency information of the first radio technology and additional interference information to the network side, then the network side can make the above three decisions and one of the following decisions corresponding to different additional interference information: (1) if the additional interference information includes TDM information, then the network side configures a TDM operation mode for all enabled radio technologies in the UE; (2) if the additional interference information is a currently available measurement result (for example, a measurement result of a neighbour cell), then the network side switches the UE to a neighbour cell which does not produce in-device coexistence interference; or if the UE is performing carrier aggregation, then the network side can delete or deactivate one or more Scells having in-device coexistence interference, and/or add or activate other Scells which have no in-device coexistence interference and are capable of performing carrier aggregation with a Pcell and have a different coverage from the deleted or deactivated Scell(s); and (3) if the additional interference information is an indication that uplink transmission of the first radio technology interferes with reception of other radio technologies, the network side reduces or limits an uplink transmission power of the first radio technology in the UE;

here, it should be noted that when the frequency information of the first radio technology reported to the network side by the UE is null, the network side cancels an interference suppression measure taken previously by it.

Step 303: The network side sends the decision to the UE.

Specifically, the network side sends the decision to the UE, and the UE performs the decision after receiving it.

Figure 4:
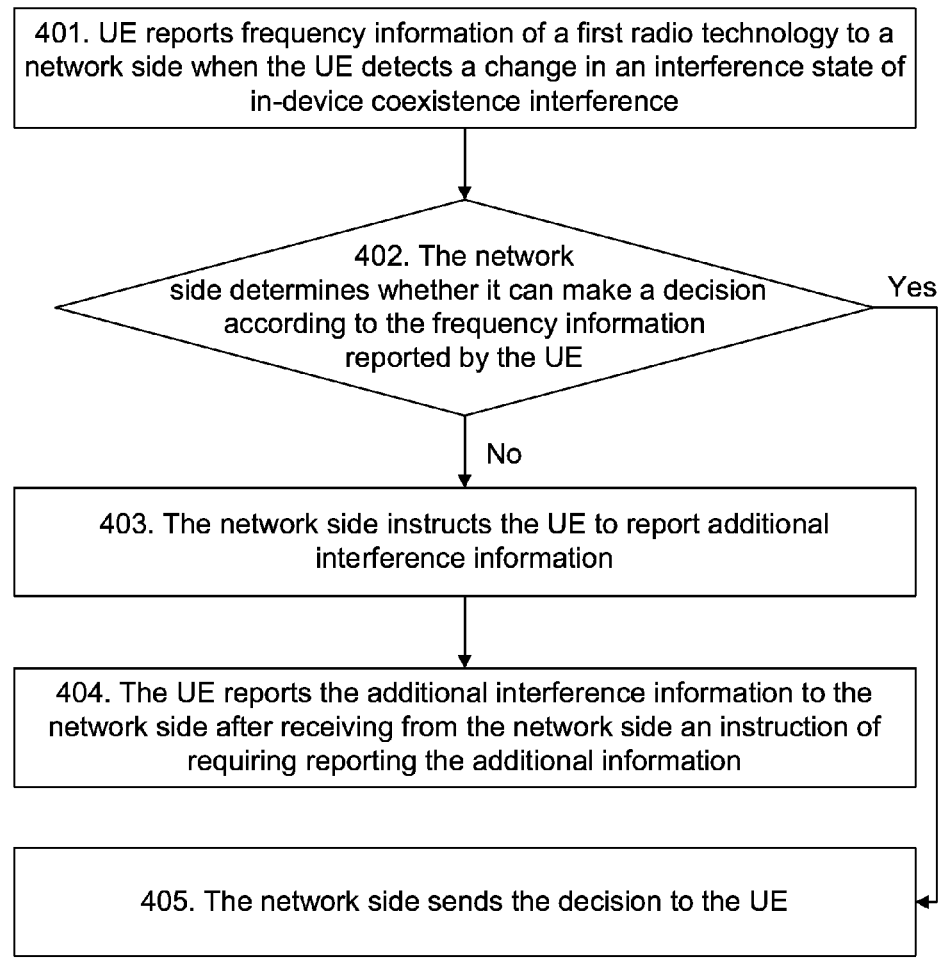
FIG. 4 is a schematic flowchart of a method for reporting interference information according to the second embodiment of the disclosure.

FIG. 4 is a schematic flowchart of a method for reporting interference information according to the second embodiment of the disclosure, and as shown in FIG. 4, the method includes the following steps:

Step 401: UE reports frequency information of a first radio technology to a network side when the UE detects a change in an interference state of in-device coexistence interference.

Please refer to Step 301 for details.

Step 402: The network side determines whether it can make a decision according to the frequency information reported by the UE, if no, Step 403 is executed; if yes, Step 405 is executed.

Specifically, after receiving the frequency information of the first radio technology reported by the UE, the network side determines whether it can make a decision according to the frequency information, if the network side can make the decision, then Step 405 is executed; if the network side still cannot make the decision according to the frequency information, Step 403 is executed; and the network side can make seven decisions, in total, wherein decision 1, decision 2 and decision 3 are the decisions that can be made by the network side according to the frequency information reported by the UE, and decisions 4-7 are the decisions that cannot be made by the network side according to the frequency information reported by the UE. The seven decisions are specifically as follows:

1: a decision can be made, and the UE is switched to a same coverage cell which does not produce in-device coexistence interference;

specifically, when the network side determines, according to frequency band information related to in-device coexistence interference reported by the UE, source utilization of the network side itself and operation strategies of operators, that there is a same coverage cell having the same coverage as coverage of a current service cell of the UE in a network and that the same coverage cell uses an undisturbed LTE frequency, the network side can make an interference suppression decision, wherein interference suppression decision refers to switching the UE to the same coverage cell, that is, switching the UE to a same coverage cell which does not produce in-device coexistence interference; at this moment, the network side can make the decision according to the frequency information of the first radio technology reported by the UE, and Step 405 is executed;

2: a decision can be made, and one or more Scells having in-device coexistence interference are deleted or deactivated, and/or other Scells having no in-device coexistence interference, which are capable of performing carrier aggregation with a Pcell and have the same coverage as the deleted or deactivated Scell(s), are added or activated;

specifically, if a current operation state of the UE is performing carrier aggregation, that is, the UE operates on one Pcell and one or more Scells simultaneously, when the network side determines, according to frequency band information related to in-device coexistence interference reported by the UE, that the Pcell has no in-device coexistence interference and only one or more Scells have in-device coexistence interference, the network side can make the interference suppression decision of deleting or deactivating one or more Scells having in-device coexistence interference;

further, when the network side determines, according to deployment of carrier aggregation, that there are other cells having no in-device coexistence interference and being capable of performing carrier aggregation with a Pcell within coverage of a same coverage cell which has the same coverage as the deleted or deactivated Scell(s), the network side can further add or activate the other cells having no in-device coexistence interference and being capable of performing carrier aggregation with a Pcell while making the interference suppression decision which is deleting or deactivating one or more Scells having in-device coexistence interference; at this moment, the network side can make the decision according to the frequency information of the first radio technology reported by the UE, and Step 405 is executed;

3: a decision can be made, and an interference suppression measure being implemented by the UE is cancelled or stopped; or specifically, if the frequency information of the first radio technology reported to the network side by the UE is null, which indicates that there is no in-device coexistence interference in the UE, then the network side can cancel or stop the interference suppression measure taken previously by the network side;

4: an uplink transmission power of the first radio technology in the UE needs to be reduced or suppressed, and a decision cannot be made at present;

specifically, a radio technology interacting with the network side is a sub-module of an interfering party, in-device coexistence interference can be suppressed by reducing or suppressing the uplink transmission power of the sub-module of the interfering party in the UE; for example, when the radio technology interacting with the network side is the first radio technology, the sub-module of the interfering party is the first radio technology, such as the LTE technology, if the LTE technology operates in Frequency band 7 in the FDD operation mode and the uplink transmission power is in progress, then the LTE technology will interfere with reception of other enabled radio technologies using an ISM frequency band in the UE, at this moment, the network side can make an interference suppression measure of controlling the uplink transmission power to reduce the uplink transmission power of the LTE technology in the UE, thereby reducing interference brought by the LTE technology to the other radio technologies; however, the network side cannot make any decision only according to the frequency information of the first radio technology reported by the UE, and the network side further needs to know an interference direction of the UE, as a result, the UE further needs to report addition interference information to the network side, and Step 403 is executed;

5: the UE needs to be switched to a neighbour cell which does not produce in-device coexistence interference, and a decision cannot be made at present;

specifically, the network side determines, according to frequency band information related to in-device coexistence interference reported by the UE, source utilization of the network side itself and operation strategies of operators, that other radio technologies in the UE will not be interfered with; however, if wanting to switch the UE to a neighbour cell, the network side further needs to know a measurement result of a neighbour cell of the current service cell of the UE, wherein the measurement result may be Reference Signal Received Quality (RSRQ) and/or Reference Signal Receiving Power (RSPP) of the neighbour cell and other parameters; at this moment, the network side cannot make any decision only according to the frequency information of the first radio technology reported by the UE, and the network side further needs to know the measurement result of a neighbour cell of the current service cell of the UE, as a result, the UE further needs to report addition interference information to the network side, and Step 403 is executed;

6: one or more Scells having in-device coexistence interference need to be deleted or deactivated, and/or one or more Scells having no in-device coexistence interference, which are capable of performing carrier aggregation with the Pcell and have a different coverage from the deleted or deactivated Scell(s), need to be added or activated, and an interference suppression decision cannot be made at present;

specifically, if a current operation state of the UE is performing carrier aggregation, that is, the UE operates on one Pcell and one or more Scells simultaneously, when the network side determines, according to frequency band information related to in-device coexistence interference reported by the UE, that the Pcell has no in-device coexistence interference and only one or more Scells have in-device coexistence interference, the network side can make the interference suppression decision of deleting or deactivating one or more Scells having in-device coexistence interference;

however, further, when the network side determines, according to deployment of carrier aggregation, that neighbour cells of the deleted or deactivated Scell(s) will not interfere with other radio technologies in the UE and are capable of performing carrier aggregation with the Pcell, the network side further needs to know measurement results of neighbour cells of the current service cell of the UE to make a decision, wherein the measurement results may be RSRQ and/or RSPP of the neighbour cells and other parameters; therefore, at this moment, the network side cannot make any decision according to the frequency information of the first radio technology reported by the UE, and the network side further needs to know the measurement result of a neighbour cell of the current service cell of the UE, as a result, the UE further needs to report addition interference information to the network side, and Step 403 is executed; and 7: a TDM operation mode needs to be configured for all enabled radio technologies producing in-device coexistence interference, and a decision cannot be made at present;

specifically, the network side can suppress interference by configuring the TDM operation mode for all enabled radio technologies producing in-device coexistence interference in the UE, for example, frequency resources of operators are extremely less in some countries such as India, a high frequency range of Frequency band 40 is only available sometimes, in this case, it is unavoidable to suppress interference using the solution of configuring the TDM operation mode for all enabled radio technologies producing in-device coexistence interference in the UE; at this moment, the network side cannot make an decision according to the frequency information of the first radio technology reported by the UE, and the network side further needs to know technology types of other radio technologies used in the current UE and service types of all radio technologies used, optional estimated communication time of all radio technologies being used and other contents, as a result, the UE needs to report addition interference information to the network side, and Step 403 is executed.

Step 403: the network side instructs the UE to report additional interference information.

Specifically, for the decisions 4-7 in Step 402, the network side notifies the UE to report the additional interference information to the network side by sending the UE an instruction of reporting the additional interference information;

wherein, for the decision 4, the network side can instruct the UE to report the additional interference information by sending an instruction of reporting additional interference information in an interference direction, at this moment, the content of the additional interference information reported by the UE is the interference direction of the UE;

for the decisions 5 and 6, the network side can instruct the UE to report the additional interference information by configuring measurement for the UE, at this moment, the content of the additional interference information reported by the UE is measurement results of neighbour cells of the current service cell of the UE itself;

for the decision 7, the network side can instruct the UE to report the additional interference information by sending an instruction of reporting additional interference information of TDM information, at this moment, the content of the additional interference information reported by the UE is the TDM information;

when the network side does not notify the UE of the content of the additional interference information to be reported, the UE sends all contents of the above additional interference information to the network side.

Step 404: the UE reports the additional interference information to the network side after receiving from the network side an instruction of requiring additional information to be reported.

Specifically, after receiving from the network side the instruction of requiring reporting the additional interference information, the UE determines the additional interference information required by the network side according to the instruction of requiring reporting the additional information, and reports the additional interference information to the network side.

Step 405: The network side sends the decision to the UE.

Specifically, for the decisions 1 and 2 in Step 402, the network side sends the decision made according to the frequency information reported by the UE to the UE, and the UE performs the decision after receiving it.

In order to realizing the above method, the disclosure further provides a system for reporting interference information, and FIG. 5 is a structural diagram of the system for reporting interference information. As shown in FIG. 5, the system includes: UE 51 and a network side 52, wherein the UE 51 is configured to report frequency information of a first radio technology or the frequency information of the first radio technology and additional interference information to the network side 52 when detecting that an interference state of in-device coexistence interference is changed; or the UE 51 is configured to report frequency information of a first radio technology to the network side 52 when detecting that an interference state of in-device coexistence interference is changed; and to report additional interference information to the network side after receiving from the network side an instruction of requiring reporting the additional information; and the network side 52 is configured to instruct the UE to report the additional interference information.

The network side 52 is further configured to make a decision according to the frequency information reported or the frequency information and the additional interference information reported, and to send the decision to the UE 51.

The above are only preferable embodiments of the disclosure, and are not intended to limit the scope of protection of the disclosure. Any modifications, equivalent substitutions, improvements or the like made within the spirit and principle of the disclosure shall fall within the scope of protection of the disclosure.

INDUSTRIAL APPLICATION

The disclosure provides a method and a system for reporting interference information, and UE. UE reports frequency information of a first radio technology or the frequency information of the first radio technology and additional interference information to a network side when the UE detects that an interference state of in-device coexistence interference is changed; or UE reports frequency information of a first radio technology to a network side when the UE detects that an interference state of in-device coexistence interference is changed, and the UE reports additional interference information to the network side after the UE receives from the network side an instruction of requiring reporting the additional information, thereby realizing that the UE reports the frequency information and the additional information related to interference to the network side; the implementation method is easy and flexible, and has higher efficiency, and can ensure that the network side can take an appropriate measure for suppressing in-device coexistence interference according to the reported frequency information and additional information.

The invention claimed is:

1. A method for reporting interference information, comprising:
   reporting, by User Equipment (UE), frequency information of a first radio technology or the frequency information of the first radio technology and additional interference information to a network side when the UE detects a change in an interference state of in-device coexistence interference; or
   reporting, by UE, frequency information of a first radio technology to a network side when the UE detects a change in an interference state of in-device coexistence interference; and reporting, by the UE, additional interference information to the network side after the UE receives from the network side an instruction of requiring reporting the additional information;
   wherein the frequency information of the first radio technology is undisturbed frequency information and/or disturbed frequency information, and the disturbed frequency information refers to a disturbed operation frequency range and/or disturbed operation frequencies of the first radio technology which produces in-device coexistence interference with enabled other radio technologies when the first radio technology and other radio technologies operate simultaneously;
   wherein the reporting frequency information of a first radio technology to a network side comprises:
      reporting, by the UE, the frequency information of the first radio technology to the network side by reporting a lower limit frequency and/or an upper limit frequency of a frequency range or by reporting a disturbed frequency range using an index number of a frequency band, wherein the lower limit frequency is a left end value of an interval of the disturbed frequency range, and the upper limit frequency is a right end value of the interval of the disturbed frequency range; wherein
      the reporting a lower limit frequency and/or an upper limit frequency of a frequency range comprises: reporting a specific value or an Evolved Universal Mobile Telecommunication System (UMTS) Terrestrial Radio Access Absolute Radio Frequency Channel Number (EARFCN); and
      the reporting a frequency range using an index number of a frequency band comprises: searching, by the UE, an index number corresponding to the frequency range in a frequency information list according to the frequency information list pre-determined by the UE and a network or the frequency information list pre-defined by a protocol, and notifying, by the UE, the index number to the network side when the UE reports the frequency information of the first radio technology.

2. The method according to claim 1, wherein
   the change in the interference state of in-device coexistence interference comprises: the UE changes from a state that there is no in-device coexistence interference to a state that there is in-device coexistence interference, and the UE changes from a state that there is in-device coexistence interference and an interference suppression measure has been performed to the state that there is no in-device coexistence interference.

3. The method according to claim 1, wherein
   the undisturbed frequency information refers to an undisturbed operation frequency range and/or undisturbed operation frequencies of the first radio technology which does not produce in-device coexistence interference with enabled other radio technologies when the first radio technology and other radio technologies operate simultaneously.

4. The method according to claim 1, further comprising:
   the frequency information of the first radio technology reported to the network side by the UE is null when the UE detects that there is no in-device coexistence interference.

5. The method according to claim 1, wherein the additional interference information is:
   Time Division Multiplexing (TDM) information when all radio technologies operate in a TDM way, and/or a currently available measurement result, and/or an indication that uplink transmission of the first radio technology interferes with reception of other radio technologies.

6. The method according to claim 1, further comprising:
   after reporting the frequency information of the first radio technology or the frequency information of the first radio technology and the additional interference information to the network side, making, by the network side, a decision according to the frequency information reported or the frequency information and the additional interference information reported and sending the decision to the UE.

7. The method according to claim 6, wherein the decision is:
   switching the UE to a same coverage cell which does not produce in-device coexistence interference; or
   cancelling or stopping an interference suppression measure being implemented by the UE; or
   switching the UE to a neighbour cell which does not produce in-device coexistence interference; or
   deleting or deactivating one or more Secondary Cells (Scells) having in-device coexistence interference, and/or adding or activating one or more Scells which have no in-device coexistence interference and are capable of performing carrier aggregation with a Primary Cell (Pcell) and have a different coverage from the deleted or deactivated Scell(s); or
   configuring a TDM operation mode for all enabled radio technologies producing in-device coexistence interference; or
   deleting or deactivating one or more Scells having in-device coexistence interference, and/or adding or activating other Scells which have no in-device coexistence interference and are capable of performing carrier aggregation with a Pcell and have a same coverage as the deleted or deactivated Scell(s); or
   reducing or limiting an uplink transmission power of the first radio technology in the UE.

8. The method according to claim 1, wherein the instructing the UE to report the additional interference information comprises:

instructing, by the network side, the UE to report the additional interference information by sending an instruction of reporting the additional interference information or by configuring measurement for the UE, wherein the instruction of reporting the additional interference information is an instruction of reporting additional interference information in an interference direction, or is an instruction of reporting additional interference information of TDM information.

9. A system for reporting interference information, comprising: User Equipment (UE) and a network side, wherein the UE is configured to report frequency information of a first radio technology or report frequency information of a first radio technology and additional interference information to the network side when the UE detects a change in an interference state of in-device coexistence interference; or the UE is configured to report frequency information of a first radio technology to the network side when the UE detects a change in an interference state of in-device coexistence interference; and to report additional interference information to the network side after the UE receives from the network side an instruction of requiring reporting the additional information; and the network side is configured to instruct the UE to report the additional interference information;

wherein the frequency information of the first radio technology is undisturbed frequency information and/or disturbed frequency information, and the disturbed frequency information refers to a disturbed operation frequency range and/or disturbed operation frequencies of the first radio technology which produces in-device coexistence interference with enabled other radio technologies when the first radio technology and other radio technologies operate simultaneously;

wherein when the UE reports the frequency information of the first radio technology to the network side, the UE is further configured to report the frequency information of the first radio technology to the network side by reporting a lower limit frequency and/or an upper limit frequency of a frequency range or by reporting a disturbed frequency range using an index number of a frequency band, wherein the lower limit frequency is a left end value of an interval of the disturbed frequency range, and the upper limit frequency is a right end value of the interval of the disturbed frequency range; wherein reporting the lower limit frequency and/or the upper limit frequency of the frequency range comprises: reporting a specific value or an Evolved Universal Mobile Telecommunication System (UMTS) Terrestrial Radio Access Absolute Radio Frequency Channel Number (EARFCN); and reporting the frequency range using the index number of the frequency band comprises: searching the index number corresponding to the frequency range in a frequency information list according to the frequency information list pre-determined by the UE and a network or the frequency information list pre-defined by a protocol, and notifying the index number to the network side when the UE reports the frequency information of the first radio technology.

10. The system according to claim 9, wherein
the network side is further configured to make a decision according to the frequency information reported or the frequency information and the additional interference information reported, and to send the decision to the UE.

11. User Equipment (UE) comprising at least a first radio transceiver and a second radio transceiver, wherein the first radio transceiver uses a first radio technology, the second radio transceiver uses a second radio technology, and an operation frequency range of the first radio technology and an operation frequency range of the second radio technology are overlapped or neighbouring at least in part;

wherein the UE is configured to report frequency information of the first radio technology used by the first radio transceiver or report frequency information of the first radio technology and additional interference information to a network side when the UE detects a change in an interference state of In-device Coexistence Interference; or the UE is configured to report frequency information of the first radio technology used by the first radio transceiver to a network side when the UE detects a change in an interference state of in-device coexistence interference; and to report additional interference information to the network side after receiving from the network side an instruction of requiring reporting the additional information;

wherein the frequency information of the first radio technology is undisturbed frequency information and/or disturbed frequency information, and the disturbed frequency information refers to a disturbed operation frequency range and/or disturbed operation frequencies of the first radio technology which produces in-device coexistence interference with enabled other radio technologies when the first radio technology and other radio technologies operate simultaneously;

wherein when the UE reports the frequency information of the first radio technology to the network side, the UE is further configured to report the frequency information of the first radio technology to the network side by reporting a lower limit frequency and/or an upper limit frequency of a frequency range or by reporting a disturbed frequency range using an index number of a frequency band, wherein the lower limit frequency is a left end value of an interval of the disturbed frequency range, and the upper limit frequency is a right end value of the interval of the disturbed frequency range; wherein reporting the lower limit frequency and/or the upper limit frequency of the frequency range comprises: reporting a specific value or an Evolved Universal Mobile Telecommunication System (UMTS) Terrestrial Radio Access Absolute Radio Frequency Channel Number (EARFCN); and reporting the frequency range using the index number of the frequency band comprises: searching the index number corresponding to the frequency range in a frequency information list according to the frequency information list pre-determined by the UE and a network or the frequency information list pre-defined by a protocol, and notifying the index number to the network side when the UE reports the frequency information of the first radio technology.

* * * * *